United States Patent
Mohr et al.

(10) Patent No.: US 6,769,745 B2
(45) Date of Patent: Aug. 3, 2004

(54) VEHICLE BRAKE SYSTEM COMPRISING A MOTOR/PUMP UNIT AND AN AGGREGATE

(75) Inventors: Kurt Mohr, Halsenbach (DE); Leo Gilles, Koblenz (DE)

(73) Assignee: Lucas Varity GmbH (DE)

( * ) Notice: Subject to any disclaimer, the term of this patent is extended or adjusted under 35 U.S.C. 154(b) by 0 days.

(21) Appl. No.: 10/165,242

(22) Filed: Jun. 7, 2002

(65) Prior Publication Data

US 2002/0153768 A1 Oct. 24, 2002

Related U.S. Application Data

(63) Continuation of application No. PCT/EP00/12349, filed on Dec. 7, 2000.

(30) Foreign Application Priority Data

Dec. 7, 1999 (DE) .......................................... 199 58 927

(51) Int. Cl.[7] ................................................ B60T 8/40
(52) U.S. Cl. ...................................... 303/116.4; 303/10
(58) Field of Search ................................ 303/10, 116.4; 417/355, 356, 338, 373, 62, 426, 286, 287

(56) References Cited

U.S. PATENT DOCUMENTS

| 2,274,274 A | | 2/1942 | Pezzillo | |
|---|---|---|---|---|
| 3,295,457 A | * | 1/1967 | Oram | 417/356 |
| 3,719,436 A | * | 3/1973 | McFarlin | 417/356 |
| 4,435,021 A | | 3/1984 | Hoenick | 303/10 |
| 4,729,717 A | * | 3/1988 | Gupta | 417/356 |
| 4,832,579 A | | 5/1989 | Norton | |
| 5,708,311 A | * | 1/1998 | Claar et al. | 417/366 |
| 5,810,568 A | * | 9/1998 | Whitefield et al. | 417/423.8 |
| 5,877,577 A | * | 3/1999 | Ishizaki et al. | 417/356 |
| 5,927,073 A | * | 7/1999 | Ishizaki et al. | 60/487 |
| 5,971,500 A | | 10/1999 | Voges et al. | |
| 6,048,179 A | * | 4/2000 | Forster | 417/364 |
| 6,672,684 B2 | * | 1/2004 | Mohr | 303/10 |

FOREIGN PATENT DOCUMENTS

| DE | 2 260 506 | | 6/1974 |
|---|---|---|---|
| DE | 36 21 967 A1 | * | 1/1988 |
| DE | 195 42 654 | | 5/1997 |
| DE | 197 07 654 | | 8/1998 |
| DE | 198 21 794 | | 11/1999 |
| JP | WO-96/27937 A1 | * | 9/1996 |

OTHER PUBLICATIONS

Document Bibliography and Abstract for DE19542654 from the esp@cenet database, http://12.espacenet.com/dips/viewer?PN=DE19542654&CY=ep&LG=DB=EPD, printed Apr. 5, 2002.

* cited by examiner

*Primary Examiner*—Thomas Williams
(74) *Attorney, Agent, or Firm*—MacMillan, Sobanski & Todd, LLC

(57) ABSTRACT

The motor/pump unit (10) comprises an electric motor (12) and at least one pump (14) for delivering brake fluid. The electric motor (12) has a stator (16), in which a rotor (18) is rotatably disposed. The pump (14) is disposed substantially inside the rotor (18) and is drivable by the latter. In order to provide a particularly compact energy source for the vehicle brake system, there is disposed adjacent to the motor/pump unit (10) at least one aggregate (23), which is drivable with the aid of the rotor (18).

22 Claims, 1 Drawing Sheet

VEHICLE BRAKE SYSTEM COMPRISING A MOTOR/PUMP UNIT AND AN AGGREGATE

CROSS REFERENCE TO RELATED APPLICATIONS

This application is a continuation of PCT application number PCT/EP00/12349 filed Dec. 7, 2000, which claimed priority from German patent application number 199 58 927.5 filed Dec. 7, 1999, the disclosures of which are hereby incorporated by reference.

BACKGROUND TO THE INVENTION

The invention relates to a vehicle brake system, which comprises a motor/pump unit with an electric motor and at least one pump for delivering brake fluid. The electric motor in this case has a stator, in which a rotor is rotatably disposed. The pump is disposed substantially inside the rotor and is drivable by the latter. The invention further relates to such a motor/pump unit.

The motor/pump unit is used to deliver brake fluid to and from wheel brakes of the vehicle brake system in order to actuate and release said wheel brakes. Vehicle brake systems of said type are also known as electrohydraulic brake systems, which may be operated during a so-called antilocking, antispin or vehicle dynamics control operation. The motor/pump unit may be disposed directly adjacent to a wheel brake of a vehicle or may be used as a central supply organ for a plurality of wheel brakes.

PRIOR ART

From U.S. Pat. No. 4,435,021 A a brake system having a vehicle brake actuator is known, in which an electric motor comprises a stator winding provided in a stationary manner and a rotor provided rotatably therein. The rotor carries a plurality of axial pistons, which are supported against an inclined end face and with the latter form a swash-plate pump. During operation of the swash-plate pump, brake fluid exits at the axial pistons and washes around the rotor. The brake fluid also passes into a gap between stator winding and rotor, gives rise there to a high fluid frictional resistance and reduces the magnetic flux between stator winding and rotor. The electric motor therefore has a low dynamic response, i.e. poor starting and response characteristics.

DE 195 42 654 A1 describes an electronically controllable brake system for motor vehicles comprising a brake pressure transmitter unit and a motor-driven auxiliary pressure source. The auxiliary pressure source, in addition to or instead of the brake pressure transmitter unit, supplies wheel brakes with hydraulic fluid. The brake system further comprises a motor-driven hydraulic pressure source, which boosts an actuation of the brake pressure transmitter unit by means of a brake pedal or which instead of the brake-pedal effects an actuation of the brake pressure transmitter unit. The auxiliary energy source and the hydraulic pressure source are driven by the same motor and are in constant driving connection with the latter. The arrangement of auxiliary energy source, hydraulic pressure source and motor takes up a great deal of installation space.

An object of the invention is to improve a vehicle brake system of the type described above.

An object of the invention is achieved by a vehicle brake system comprising a motor/pump unit, which has the features described above and is developed in such a way that there is disposed adjacent to the motor/pump unit at least one aggregate (i.e., an attached assembly such as a pneumatic or hydraulic pump in addition to the pump of the motor/pump unit), which is drivable with the aid of the rotor.

By virtue of the solution according to the invention the arrangement of motor/pump unit and aggregate is of a particularly compact design and takes up only a little installation space. Because of the compact form of construction only low masses are to be accelerated, with the result that the motor/pump unit and the additional aggregate have good starting and response characteristics. Brake fluid may therefore be delivered in a highly dynamic manner. The electric motor and the pump are themselves of an extremely compact, so-called cartridge style of construction. In this case, it is also possible for a plurality of pumps to be in particular radially surrounded by a rotor.

SUMMARY OF THE INVENTION

An object is achieved according to the invention also by such a motor/pump unit.

An advantageous development provides that the rotor is in constant driving connection with the aggregate. This connection may be easily formed e.g. via a shaft, with the result that a costly coupling susceptible to faults is not required.

The aggregate advantageously takes the form of a pneumatic or hydraulic pump. The motor/pump unit together with the aggregate therefore forms a compact supply unit, which provides all of the pressure energies needed for a vehicle brake system.

In an advantageous development, the aggregate is a hydraulic aggregate with a radial piston pump, such as is used in known ABS and ASC brake systems. With the aid of the coupling according to the invention of said radial piston pump to a motor/pump unit, brake systems may easily be fitted or retrofitted with a second pressure source.

An advantageous design provides that the stator and at least one portion of the rotor directed towards the stator define an electromagnetic region, at least the pump defines a hydraulic region, and at least one sealing element is provided, which separates the electromagnetic region from the hydraulic region in a fluid-tight manner. The sealing element separates the stator and the portion of the rotor facing it from the hydraulic region of the pump, in which brake fluid is situated. As a result, no brake fluid may pass into the gap between stator and rotor. No fluid frictional resistance therefore arises in the gap and the dynamic response of the electric motor is considerably improved. Said measure also increases the efficiency of the electric motor. A control-optimized combination of electric motor and pump is created. What is more, as the electromagnetic region is separated from the hydraulic region in a fluid-tight manner, no dirt may pass into the electromagnetic region. Fouling and damaging of the stator, e.g. by aggressive brake fluid, is therefore reliably prevented.

The vehicle brake system is advantageously developed in such a way that only an air gap is situated between the stator and the rotor. In the case of the vehicle brake actuator described in U.S. Pat. No. 4,435,021 A, the entire rotor is situated in the hydraulic region. The motor winding is therefore internally surrounded by a partition, which separates it from the hydraulic region and also from the rotor. In the case of the solution according to the invention, on the other hand, it is possible to dispense with said partition. The distance between the stator and the rotor may therefore be made very small. The electric motor consequently has an additionally increased efficiency and further improved response and starting characteristics.

An advantageous development provides that the stator is provided in a stationary manner in a housing, and the sealing element is formed in an annular manner between the rotor and the housing. This particularly simple construction of the invention makes it possible to use, as a sealing element, a conventional, inexpensive sealing ring, which may be selected from a wide range and may therefore be adapted extremely well to the sealing problem to be solved.

In an advantageously developed vehicle brake system, the rotor is supported rotatably about an axis of rotation in the housing by means of two bearings, which are disposed at the axial end regions of the rotor. The bearings enable precise guidance of the rotor, wherein the position of the latter may be adjusted independently of the pump.

The rotor is advantageously of a substantially cup-shaped design and comprises at its base a coaxially provided and motionally coupled drive shaft for driving the pump and the aggregate. Because the cup shape is open only in one direction, given such a design in the rotor a closed chamber for the pump may be sealed particularly easily. For example, for this purpose a sealing element may be disposed at the opening of the cup-shaped rotor.

Advantageously, however, the housing comprises a substantially hollow-cylindrical housing portion, which projects radially at the inside and coaxially into the cup-shaped rotor, and the sealing element is disposed between the hollow-cylindrical housing portion and the drive shaft. The rotor is consequently sealed at a relatively small surface and a sealing element with a small diameter may be used. Such sealing elements present a lower frictional resistance and take up only a little installation space. Furthermore, because the housing portion is disposed between the rotor and the pump, no flow-generated friction arises between rotor and pump.

The pump advantageously takes the form of a gear pump, nutating disk pump or swash-plate pump. Such a pump has a constant drive power over time and may therefore be driven by a relatively low-power electric motor.

BRIEF DESCRIPTION OF THE DRAWINGS

Further features and properties are explained in the description of an embodiment with reference to the accompanying drawing.

DETAILED DESCRIPTION OF THE INVENTION

Figure 1:
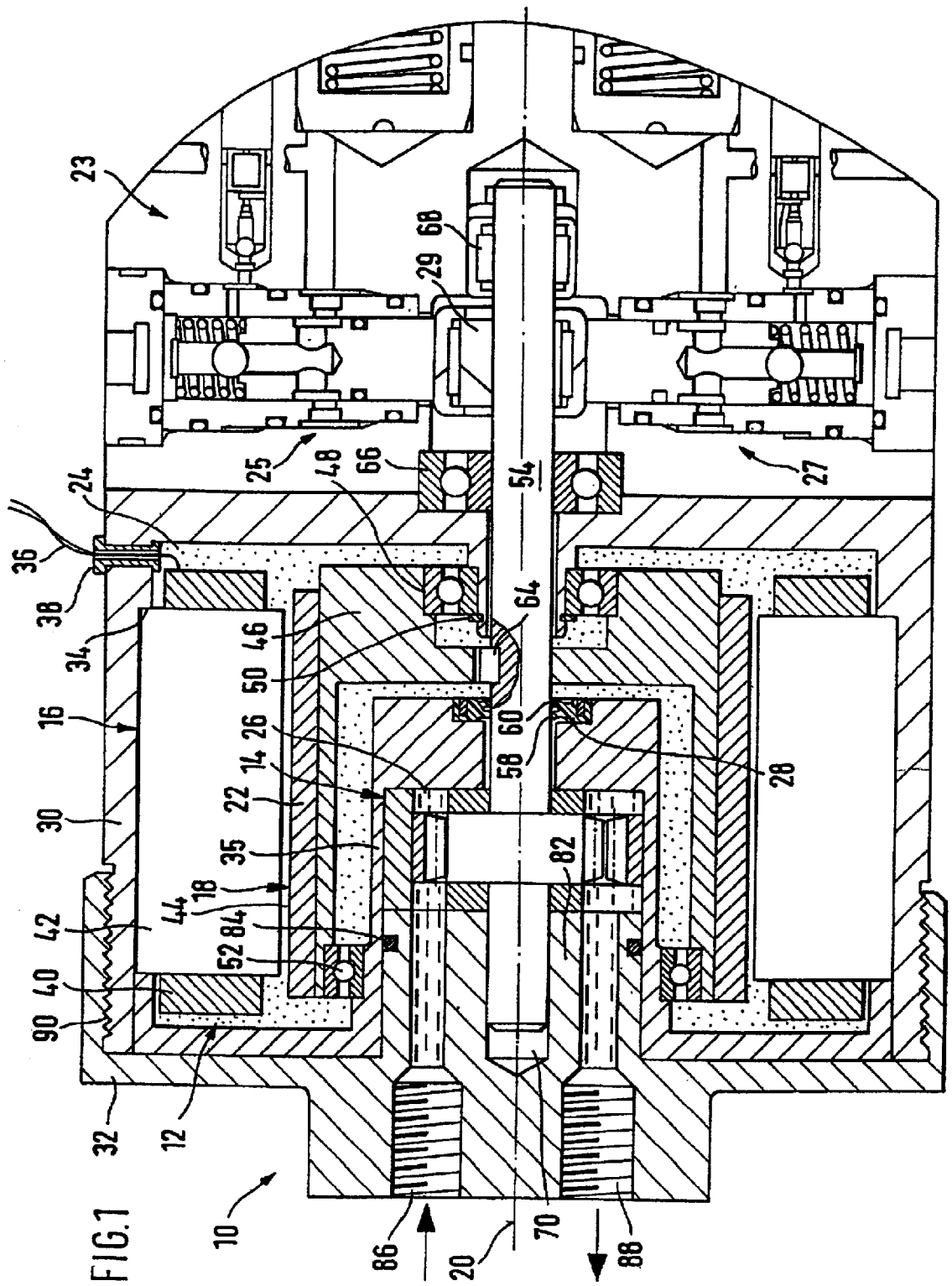
FIG. 1 shows an embodiment of a motor/pump unit according to the invention with a partially illustrated aggregate in longitudinal section.

A motor/pump unit 10 of an antilock vehicle brake system, which is not further illustrated, comprises an electric motor 12 and a pump 14.

The electric motor 12, comprising a hollow-cylindrical stator 16 and a rotor 18 disposed therein, takes the form of a brushless d.c. motor. The rotor 18 is rotatable about an axis of rotation 20 and its portion radially facing the stator 16 has permanent magnets 22. The rotor 18 is of a substantially hollow-cylindrical design. In a cavity of the rotor 18 the pump 14 is disposed coaxially with the axis of rotation 20. During operation of the motor/pump unit 10 the pump 14 is driven with the aid of the rotor 18 in order to deliver brake fluid to, or from, non-illustrated wheel brakes.

In order to obtain a highly dynamic and, at the same time, compact energy source for the vehicle brake system, the rotor 18 is coupled to an aggregate 23, which adjoins the motor/pump unit 10, forms part of the vehicle brake system and is used to deliver brake fluid. The aggregate may alternatively be used as an auxiliary energy source for a hydraulic or pneumatic brake booster. It is however also possible for the pump of the pump/motor unit to be used as an auxiliary energy source, in which case the aggregate delivers brake fluid to, or from, the wheel brakes.

In the illustrated embodiment, the aggregate 23 is a radial piston pump having two radially directed, opposing pistons 25 and 27, which are displaceable with the aid of a central eccentric 29.

The stator 16 and the rotor 18 are surrounded by a gas space 24 (indicated by clots), in which air is situated. This part of the motor/pump unit 10 is referred to as the electromagnetic region. The pump 14 is further surrounded by a fluid space 26 (indicated by dashed lines), which is filled with brake fluid, wherein said part is referred to as the hydraulic region of the motor/pump unit 10. Disposed between the electromagnetic and the hydraulic region is an annular sealing element 28, which separates said regions in a fluid-tight manner. As no brake fluid may therefore be situated in the electromagnetic region, no fluid friction arises between stator 16 and rotor 18. The motor/pump unit 10 therefore has a high dynamic response. What is more, the stator 16 and the rotor 18 cannot become fouled or damaged by the brake fluid.

The motor/pump unit 10 is externally delimited by a cup-shaped housing part 30, which is rotationally symmetrical relative to the axis of rotation 20 and is closed at its, in the drawing, left end by a housing lid 32. Formed axially in the housing part 30 is a step 34, against which the stator 16 is supported. The stator 16 is held axially between the step 34 and a collar of a housing part 35 yet to be described and is supported radially against the housing part 30.

Opposite the housing lid 32 the cup-shaped housing part 30 has in its annular wall an opening, through which a supply lead 36 extends into the interior of the housing part 30. The point of penetration of the supply lead 36 is sealed by means of an elastomer sleeve 38.

The stator 16 has a stator winding 40, which is laid around an iron core 42. Between the iron core 42 and the permanent magnets 22 there is only a narrow air gap 44.

The rotor 18 comprises a cup-shaped rotor body 46 which radially at the outside carries the permanent magnets 22. The cup-shaped rotor body 46 is supported at its, in the drawing, right end portion by means of a ball bearing 48, which is held in the cup-shaped housing part 30 by a spring washer 50. The end portion of the cup-shaped rotor body 46 axially opposite the ball bearing 48 is supported with the aid of a second ball bearing 52 via the housing part 35 against the housing lid 32. The rotor body 46 is thus positioned precisely relative to the stator 16. A particularly narrow air gap 44 may therefore be formed.

A drive shaft 54 coaxially penetrates a base of the cup-shaped rotor body 46 and projects into the cavity formed by the rotor body 46. From the opposite side to the base of the cup-shaped rotor body 46 the hollow-cylindrical housing portion 35 projects into the cavity. The housing portion 35 is stepped at the end region facing the drive shaft 54 and, there, carries the annular sealing element 28, which effects sealing relative to the drive shaft 54. The sealing element 28 is pressed into the housing portion 35 and comprises two sealing lips 58 and 60, which lie against the drive shaft 54. The sealing element 28 is U-shaped in cross-section, wherein the opening of the U shape is directed towards the hydraulic region. The sealing lip 58 is therefore pressed by hydraulic pressure against the drive shaft 54.

The pump 14 is accommodated axially adjacent to the sealing element 28 in the housing portion 35. The pump 14 takes the form of a gear pump, is of a conventional construction and is drivable with the aid of the drive shaft 54. To this end, the rotor body 46 is connected by means of a featherkey 64 non-rotatably to the drive shaft 54.

Axially adjoining the pump 14 is the housing lid 32, which has a projection 82 protruding into the housing portion 35. The drive shaft 54 projects with its, in the drawing, left end region into a bore 70, which is formed coaxially in the projection 82 and in which the drive shaft 54 is slidingly mounted. At the opposite side to the pump 14 the drive shaft 54 at the ball bearing 48 penetrates the end wall of the cup-shaped housing part 30 and projects into the aggregate 23. There, the drive shaft 54 is supported by means of two bearings 66 and 68. Alternatively, only the bearing 68 or none of the two bearings 66 and 68 may be provided. Between the bearings 66 and 68 the eccentric 29 is pressed onto the drive shaft 54.

A sealing ring 84 is inserted in the projection 82 at the outer lateral surface facing the housing portion 35. The housing lid 32 is provided with two connections 86 and 88 for connecting the motor/pump unit 10 to non-illustrated brake fluid lines. Formed on the cup-shaped housing part 30 is an external thread 90, onto which the housing lid 32 is screwed. The housing lid 32 therefore closes the fluid space 26 in a fluid-tight manner.

During operation of the motor/pump unit 10 the rotor 18 rotates relative to the stator 16 and in so doing rotates the drive shaft 54. The drive shaft 54 drives the pump 14 and the aggregate 23 in order to deliver brake fluid.

In a non-illustrated embodiment, the rotor comprises a hollow-cylindrical rotor body, which is supported at its axial end regions in each case by a bearing in the cup-shaped housing part and in the housing lid.

In this case, in the cup-shaped housing part and in the housing lid a respective annular sealing element is disposed radially externally around of the bearings and effects sealing between the hollow-cylindrical rotor body and the housing part and/or housing lid. Thus, as described above, the electromagnetic region is separated from the hydraulic region.

In such an embodiment, the drive shaft may be designed in such a way that it penetrates both the housing part and the housing lid and at each of the two projecting portions drives a further aggregate.

The principle and mode of operation of this invention have been described in its preferred embodiments. However, it should be noted that this invention may be practiced otherwise than as specifically illustrated and described without departing from its scope.

What is claimed is:

1. A vehicle brake system, which comprises:
a motor/pump unit having an electric motor and at least one pump for delivering brake fluid, wherein
the electric motor comprises a stator, in which a rotor is rotatably disposed, and
the pump is disposed substantially inside the rotor and is drivable by the latter, characterized in that
the stator and the rotor are surrounded by a gas-filled space, and the rotor, the stator, and the gas-filled space define an electromagnetic region,
the pump is surrounded by a fluid space and the pump and the fluid space define a hydraulic region, and
at least one sealing element is provided which separates the electromagnetic region from the hydraulic region in a fluid-tight manner,
wherein a portion of the gas-filled space is defined between an inner surface of the rotor and the hydraulic region, and
disposed adjacent to the motor/pump unit is at least one aggregate, which is drivable with the aid of the rotor.

2. The vehicle brake system according to claim 1, characterized in that the rotor is in constant driving connection with the aggregate.

3. The vehicle brake system according to claim 1, characterized in that the aggregate is one of a pneumatic pump and a hydraulic pump.

4. The vehicle brake system according to claim 1, characterized in that the aggregate is a radial piston pump.

5. The vehicle brake system according to claim 1, wherein the entire rotor is surrounded by the gas-filled space.

6. The vehicle brake system according to claim 1, characterized in that an air gap is situated between the stator and the rotor.

7. The vehicle brake system according to claim 6, characterized in that the stator is provided in a stationary manner in a housing, and the sealing element is formed in an annular manner between the rotor and the housing.

8. The vehicle brake system according to claim 7, characterized in that the rotor is supported rotatably about an axis of rotation in the housing by means of two bearings, which are disposed at axial end regions of the rotor.

9. The vehicle brake system according to claim 8, characterized in that the rotor is of a substantially cup-shaped design and comprises at its base a coaxially provided and motionally coupled drive shaft for driving the pump and the aggregate.

10. The vehicle brake system according to claim 9, characterized in that the housing comprises a substantially hollow-cylindrical housing portion, which projects radially at the inside and coaxially into the cup-shaped rotor, and the sealing element is disposed between a hollow-cylindrical housing portion and the drive shaft.

11. The vehicle brake system according to claim 1, characterized in that the pump is one of a gear pump, a nutating disk pump and a swash-plate pump.

12. A motor/pump unit for an electrohydraulic vehicle brake system comprising:
an electric motor including a stator in which a rotor is rotatable disposed;
at least one pump for delivering brake fluid, the pump being disposed substantially inside the rotor of the electric motor and being driven by the rotor; and
at least one aggregate disposed adjacent to the motor/pump unit, the aggregate being driven by the rotor of the electric motor, wherein
the stator and the rotor are surrounded by a gas-filled space, and the rotor, the stator, and the gas-filled space define an electromagnetic region,
the pump is surrounded by a fluid space, and the pump and the fluid space define a hydraulic region,
wherein a portion of the gas-filled space is defined between an inner surface of the rotor and the hydraulic region, and
at least one sealing element is provided which separates the electromagnetic region from the hydraulic region in a fluid-tight manner.

13. The motor/pump unit according to claim 12, wherein the rotor is in constant driving connection with the aggregate.

14. The motor/pump unit according to claim 12, wherein the aggregate is one of a pneumatic pump and a hydraulic pump.

15. The motor/pump unit according to claim 12, wherein the aggregate is a radial piston pump.

16. The vehicle brake system according to claim 12, wherein the entire rotor is surrounded by the gas-filled space.

17. The motor/pump unit according to claim 12, wherein the stator is provided in a stationary manner in a housing, and the sealing element is formed in an annular manner between the rotor and housing.

18. The motor/pump unit according to claim 17, wherein the rotor is of a substantially cup-shaped design and comprises at its base a coaxially provided and motionally coupled drive shaft for driving the pump and the aggregate.

19. The motor/pump unit according to claim 12, wherein the pump is one of a gear pump, a nutating disk pump, and a swash-plate pump.

20. An assembly comprising:
   an electric motor having a rotor disposed within a stator, the rotor defining a cavity;
   a first pump substantially disposed within the cavity of the rotor of the electric motor, the first pump being driven by the rotor of the electric motor; and
   a second pump disposed outside the cavity of the rotor and operatively connected to be driven by the rotor of the electric motor, wherein
      the stator and the rotor are surrounded by a gas-filled space, and the rotor, the stator, and the gas-filled space define an electromagnetic region,
      the first pump is surrounded by a fluid space and the pump and the fluid space define a hydraulic region, and
      at least one sealing element is provided which separates the electromagnetic region from the hydraulic region in a fluid-tight manner.

21. The vehicle brake system according to claim 20, characterized in that an air gap is situated between the stator and the rotor.

22. The vehicle brake system according to claim 20, wherein the entire rotor is surrounded by the gas-filled space.

* * * * *